(12) United States Patent
Evans (10) Patent No.: US 11,348,088 B2
(45) Date of Patent: May 31, 2022

(54) AUTOMATED SESSION CLOSING UPON LOCATION-SENSED DEPARTURE

(71) Applicant: NCR Corporation, Atlanta, GA (US)

(72) Inventor: Curtis Evans, Smyrna, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/057,195

(22) Filed: Aug. 7, 2018

(65) Prior Publication Data
US 2018/0341941 A1   Nov. 29, 2018

Related U.S. Application Data

(62) Division of application No. 14/499,794, filed on Sep. 29, 2014.

(51) Int. Cl.
| | |
|---|---|
| *G06Q 20/32* | (2012.01) |
| *G06Q 20/14* | (2012.01) |
| *G06Q 20/20* | (2012.01) |
| *H04W 4/029* | (2018.01) |
| *G06Q 30/04* | (2012.01) |
| *G06Q 30/06* | (2012.01) |

(52) U.S. Cl.
CPC ......... *G06Q 20/3224* (2013.01); *G06Q 20/14* (2013.01); *G06Q 20/32* (2013.01); *G06Q 30/04* (2013.01); *G06Q 30/06* (2013.01); *H04W 4/029* (2018.02); *G06Q 20/20* (2013.01)

(58) Field of Classification Search
CPC ..................................................... G06Q 20/14
USPC ........................................................... 705/40
See application file for complete search history.

(56) References Cited

U.S. PATENT DOCUMENTS

| | | | | |
|---|---|---|---|---|
| 9,972,004 | B1* | 5/2018 | Donavalli | G06Q 20/3224 |
| 2012/0101942 | A1* | 4/2012 | Park | G07B 15/02 |
| | | | | 705/40 |
| 2012/0256685 | A1* | 10/2012 | DelPapa | H02M 3/3387 |
| | | | | 330/127 |
| 2012/0265585 | A1* | 10/2012 | Muirbrook | G06Q 20/20 |
| | | | | 705/13 |
| 2013/0138518 | A1* | 5/2013 | White | G06Q 20/204 |
| | | | | 705/16 |
| 2013/0232017 | A1* | 9/2013 | Nathanel | G06Q 20/20 |
| | | | | 705/16 |
| 2014/0006206 | A1* | 1/2014 | Scrivner | G06Q 10/083 |
| | | | | 705/26.8 |

(Continued)

*Primary Examiner* — Lindsay M Maguire
(74) *Attorney, Agent, or Firm* — Schwegman, Lundberg & Woessner (57) ABSTRACT

Various embodiments herein each include at least one of systems, devices, methods, and software for automated session closing upon location-sensed departure. Some such embodiments may be implemented at retail outlets (e.g., restaurants, salons, stores, etc.) to automatically charge a customer account for ordered items upon an automated detection of a customer retail outlet departure. One embodiment, in the form of a method performed on a server-based system, includes receiving, via a network from a mobile device associated with a customer account, first data indicating the mobile device has departed a retail outlet. The method then generates, from stored retail session data, a final bill including an amount payable and then charges an amount payable from the final bill to a payment account associated with the customer account.

3 Claims, 4 Drawing Sheets

(56) References Cited

U.S. PATENT DOCUMENTS

2015/0120345 A1* 4/2015 Rose ..................... G06Q 50/12
705/5

* cited by examiner

AUTOMATED SESSION CLOSING UPON LOCATION-SENSED DEPARTURE

The present application is a divisional application of and claims priority to application Ser. No. 14/499,794 filed on Sep. 29, 2014, and issued as U.S. Pat. No. 10,803,439 on Oct. 13, 2020.

BACKGROUND INFORMATION

At retail outlets, customers often wait in lines to pay for items and services. This is true even at restaurants where there may be a line at a point of sale terminal or simply for wait staff to return with a check and then to return with proper change or a bankcard used to pay. Despite the quality of the retail experience up to the point of payment, customers are often left with a bad experience in their minds when the final payment portion of their experience is negative.

SUMMARY

Various embodiments herein each include at least one of systems, devices, methods, and software for automated session closing upon location-sensed departure. Some such embodiments may be implemented at retail outlets (e.g., restaurants, salons, stores, etc.) to automatically charge a customer account for ordered items upon an automated detection of a customer retail outlet departure.

One embodiment, in the form of a method performed on a server-based system, includes receiving, via a network from a mobile device associated with a customer account, first data indicating the mobile device has departed a retail outlet. The method then generates, from stored retail session data, a final bill including an amount payable and then charges an amount payable from the final bill to a payment account associated with the customer account.

Another method embodiment is performed on a mobile device, such as within an app while interacting with various hardware elements present on the mobile device. The method of such embodiments includes receiving a first beacon identifier on a mobile device from a first beacon device associated with a serving location. The method further includes transmitting, via a network from the mobile device to a backend system, the first beacon identifier and customer account identifying data to associate a dining session at the serving location with the customer account.

A system according to some embodiments includes at least one network interface device, at least one processor, and at least one memory. The memory of such embodiments stores an instruction set that is executable by the at least one processor to perform data processing activities. These data processing activities include receiving, via the at least one network interface device from a mobile device associated with a customer account, first data indicating the mobile device has departed a dining session location. The data processing activities further include generating, from stored dining session data, a final bill including an amount payable. Subsequently, the data processing activities of such embodiments include charging an amount payable from the final bill to a payment account associated with the customer account.

DETAILED DESCRIPTION

Various embodiments herein each include at least one of systems, devices, methods, and software for automated session closing upon location-sensed departure. Such sessions are retail sessions, such as visits to restaurants, salons, stores, and the like. Operators of such retail outlets strive to improve customer experiences while also reducing operating costs. The various embodiments herein generally address both by enabling customers to conduct a retail session, depart the retail outlet, and have the cost of the goods and services of their retail session automatically charged to a payment account.

Some such embodiments associate a retail session with a customer account, track goods and services chosen during the retail session, detect when a customer departs the retail outlet, and charges the customer's payment account. Such embodiments are typically enabled in part through an app present on a customer mobile device and received on the mobile device from a beacon device or a positioning system such as a Global Positioning System (GPS) device present on the mobile device. These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
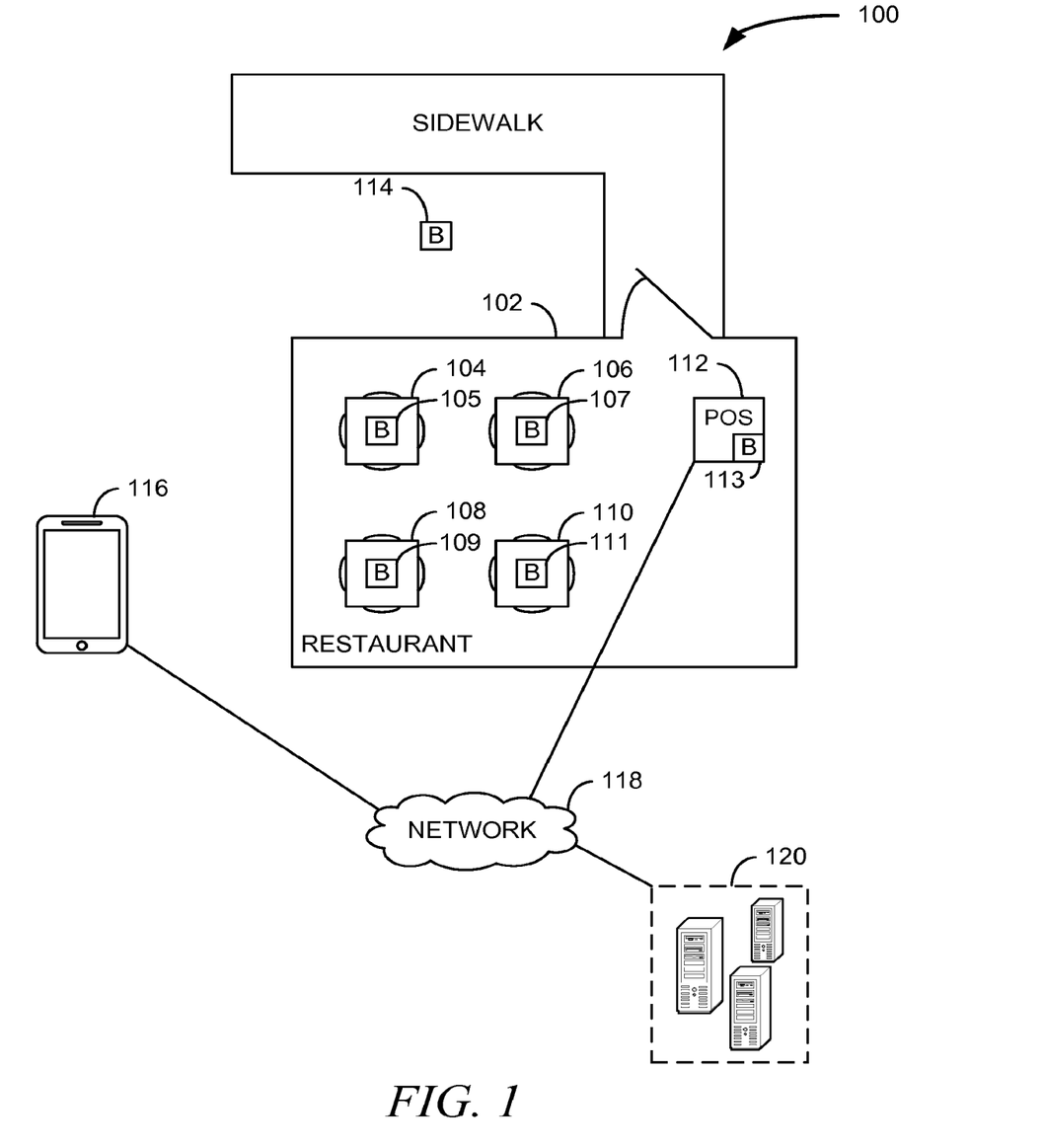
FIG. 1 is a logical block diagram of a system, according to an example embodiment.

FIG. 1 is a logical block diagram of a system 100, according to an example embodiment. The system 100 is illustrated as deployed with regard to a restaurant 102. The system 100 operates to associate a customer account maintained in at least one of a backend computing system 120 and a point of sale (POS) terminal 112 with a dining session at the restaurant 102.

In an example embodiment, a customer carrying a mobile device 116, such as a smartphone, smartwatch, or tablet, enters the restaurant 102. The customer mobile device 116 typically includes a mobile device app that executes thereon that allows the customer to perform various actions, such as one or more of creating an account, adding and modifying payment account information, viewing receipts of past dining experiences, viewing a current bill, and the like. The mobile device app, in some embodiments, receives data via a transceiver device present on the mobile device, such as one or both of a BLUETOOTH® device and a WI-FI® device. An example of data that may be received by the mobile device 116 app is data from one or more beacon devices 105, 107, 109, 111, 113, 114 deployed in and around the restaurant 102. The data from the one or more beacon devices 105, 107, 109, 111, 113, 114 typically includes identifiers of the respective beacon devices that enable the mobile device 116 app to determine a location.

In an example embodiment, the beacon devices 105, 107, 109, 111, 113, 114 broadcast a radio signal encoded with identifying data that is registered in the backend system 120 with a known location, such as the POS terminal 112 or a table 104 in the particular restaurant 102. The positioning beacon device, in some embodiments, may include a radio transceiver device, such as a BLUETOOTH® beacon device. Among others, such beacon devices are available from NCR Corporation of Duluth, Ga. The positioning beacon device may also, or alternatively, include a WI-FI® Wireless Access Point (WAP) device in some embodiments. The radio signal, or signals, broadcast by the beacon device are received by the mobile device 116 and the app or the backend system 120 may then determine a location of the mobile device based on one or more of the received signals. The position may also be determined based in part on a signal strength of each of the one or more signals received by the mobile device 116.

The positioning data as determined by one or both of the app on the mobile device 116 and the backend system 120 may then be used to associate the customer account of a customer carrying the mobile device 116 with a dining session. For example, the positioning data may result in a determination that the mobile device is located at one of the restaurant 102 tables 104, 106, 108, 110. Based on this determination and a dining session previously initiated with regard to a particular table 104, 106, 108, 110 by wait staff or a greeter on another mobile device, the determined location can be associated with the dining session. However in some embodiments, upon determining the location of the mobile device 116 at one of the tables 104, 106, 108, 110, the dining session may be initiated within the app. In other embodiments, to associate a dining session or a portion of a dining session (e.g., where a single group of the dining session is to be billed in two or more checks) wait staff may provide a code of the dining session, or portion thereof. The customer may then enter that code into the mobile device app to associate their customer account with the particular dining session.

In some embodiments, once the customer account is associated with the dining session, a message or data item may be transmitted from the backend system 120 to one or more wait staff member and the restaurant generally to inform the restaurant and wait staff that when the customer leaves, the bill will be paid automatically. This is to avoid concern that the customer is leaving or has left without paying their bill In some embodiments, the mobile device 116 app may be manipulated to view a dining menu. The dining menu may be a part of the app or menu data may be retrieved from the backend system 120 or other network 118 location. In some embodiments, the mobile device 116 app may also allow the customer to select menu items to order and the mobile device 116 communicates the selections to a computing system of the restaurant 102, either directly or via the backend system 120. In these and other embodiments, ordered items may also or alternatively be ordered via conventional wait staff. As items are ordered, data of the ordered items is provided to the backend system 120. The backend system 120 may maintain a record of the ordered items or at least their prices or relay this data to the POS terminal 112 or other terminal in the restaurant 102.

Eventually the dining session ends and the customer needs to pay their bill. The mobile device 116 app may provide a selectable option to pay the bill before departing the restaurant 102. The bill will be paid via a payment account associated with the customer account. If the customer does not select such an option in the mobile device 116 app, or the mobile device 116 app does not include the option, the mobile device 116 app will sense when it has departed the restaurant 102.

The mobile device 116 app may sense it has departed the restaurant 102 in various ways in different embodiments. In some embodiments, the mobile device 116 app may no longer be receiving signals from one or more of the beacon devices 105, 107, 109, 111, 113, 114. In some other embodiments, the mobile device app may receive a signal from one or more particular beacon devices, such as beacon device 113 located near the restaurant exit or beacon device 114 that is located outside the restaurant. In an additional embodiment, the mobile device 116 app may obtain or receive positioning data from a positioning device, such as a GPS device of the mobile device 116, or positioning data from another service that operates on the mobile device 116 or retrieves positioning data via the network 118.

Further details of some such embodiments are described with regard to the following methods.

Figure 2:
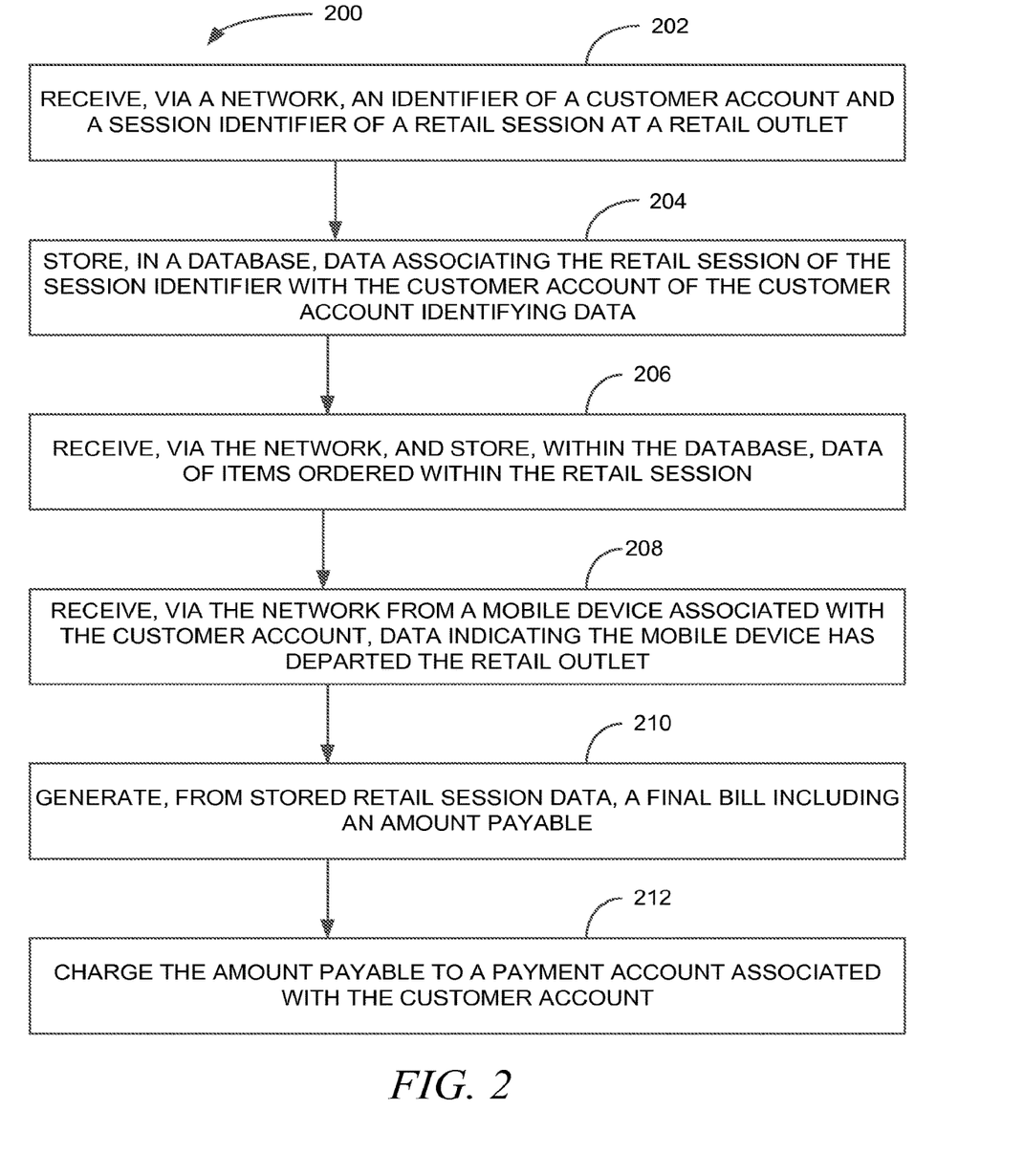
FIG. 2 is a block flow diagram of a method, according to an example embodiment.

FIG. 2 is a block flow diagram of a method 200, according to an example embodiment. The method 200 is an example of a method that is performed by a backend system, such as backend system 120 illustrated and described with regard to FIG. 1. However, in some embodiments, portion of the method 200 as described herein may also be performed by a computing device at a retail outlet, such as by the POS terminal 112 of the restaurant 102 as illustrated and described with regard to FIG. 1.

The method 200 includes receiving 202, via a network, an identifier of a customer account and a session identifier of a retail session at the retail outlet, such as a store, restaurant, salon, and the like. The method 200 further includes storing 204, in a database, data associating the retail session of the session identifier with the customer account of the customer account identifying data. In some embodiments, the method 200 also includes receiving 206, via the network, and storing, within the database, data of items ordered or selected within the retail session. However, in other embodiments, data of items ordered is maintained locally by a system of the retail outlet, but may be accessed when such data may be needed by a backend system performing the method 200.

The method 200 may then receive 208, via the network from the mobile device associated with the customer account, data indicating the mobile device has departed a retail outlet. Upon receipt of the indication the mobile device has departed the retail outlet, the method 200 generates 210, from the stored retail session data, a final bill including an amount payable. The amount payable is then charged 212 to a payment account associated with the customer account. In some such embodiments, the data indicating the mobile device has departed the retail outlet may be received by a computing system of the retail outlet and this computing device may generate 210 the final bill and charge 212 the payment account.

The method 200 may then also generate and transmit a receipt of the retail session to an account holder of the customer account. In some further embodiments, the method 200 may also transmit a retail session feedback request to the account holder of the customer account, such as within a mobile device app, in an email, in a text message, and the like. In some such embodiments, the feedback request is a link to an online survey.

In some embodiments, the method 200 may transmit data to at least one computing device of the retail outlet indicating payment has been received for the retail session. In these and other embodiments, upon storing 204 the data associating the retail session with the customer account, data may also be transmitted to the computing device of the retail outlet indicating the customer is utilizing the automatic payment functionality as described herein.

In some embodiments of the method 200, receiving 202 the session identifier of the retail session includes receiving a beacon identifier associated with a serving location within the retail outlet, such as from a beacon associated with and registered to a particular table in a restaurant or a particular chair in a salon. In such embodiments, the method 200 then queries the database to retrieve the retail session identifier associated with the serving location.

In further embodiments of the method 200, receiving 208 data indicating the mobile device has departed the retail outlet includes receiving, via the network from the mobile device, second data including customer account identifying data and location data. The method 200 in such embodiments then associates the second data with the stored retail session data and determines the location data of the second data is outside the retail outlet.

In some such embodiments, the location data of the second data is an identifier of a beacon device, such as a BLUETOOTH® beacon device. In such embodiments, determining the location data of the second data is outside the retail outlet includes querying a database of registered beacon devices to determine whether the beacon identifier is external to the retail outlet. When the beacon device is external to the retail outlet, the method 200 triggers the generating 210 of the final bill and the charging 212 to the payment account. In some embodiments, prior to the generating 210 and the charging 212, a notification may be transmitted to the mobile device requesting confirmation of whether the customer is planning to return, such as if the customer is just going to their car to retrieve something. However, in some other embodiments, upon determining the location data of the second data is outside the retail outlet the method stores a time value and waits for a period to elapse. When the period has elapsed without receiving third data including customer account identifying data and location data associated with a location within the retail outlet, the method then proceeds with the generating 210 of the final bill and the charging 212 to the payment account.

Figure 3:
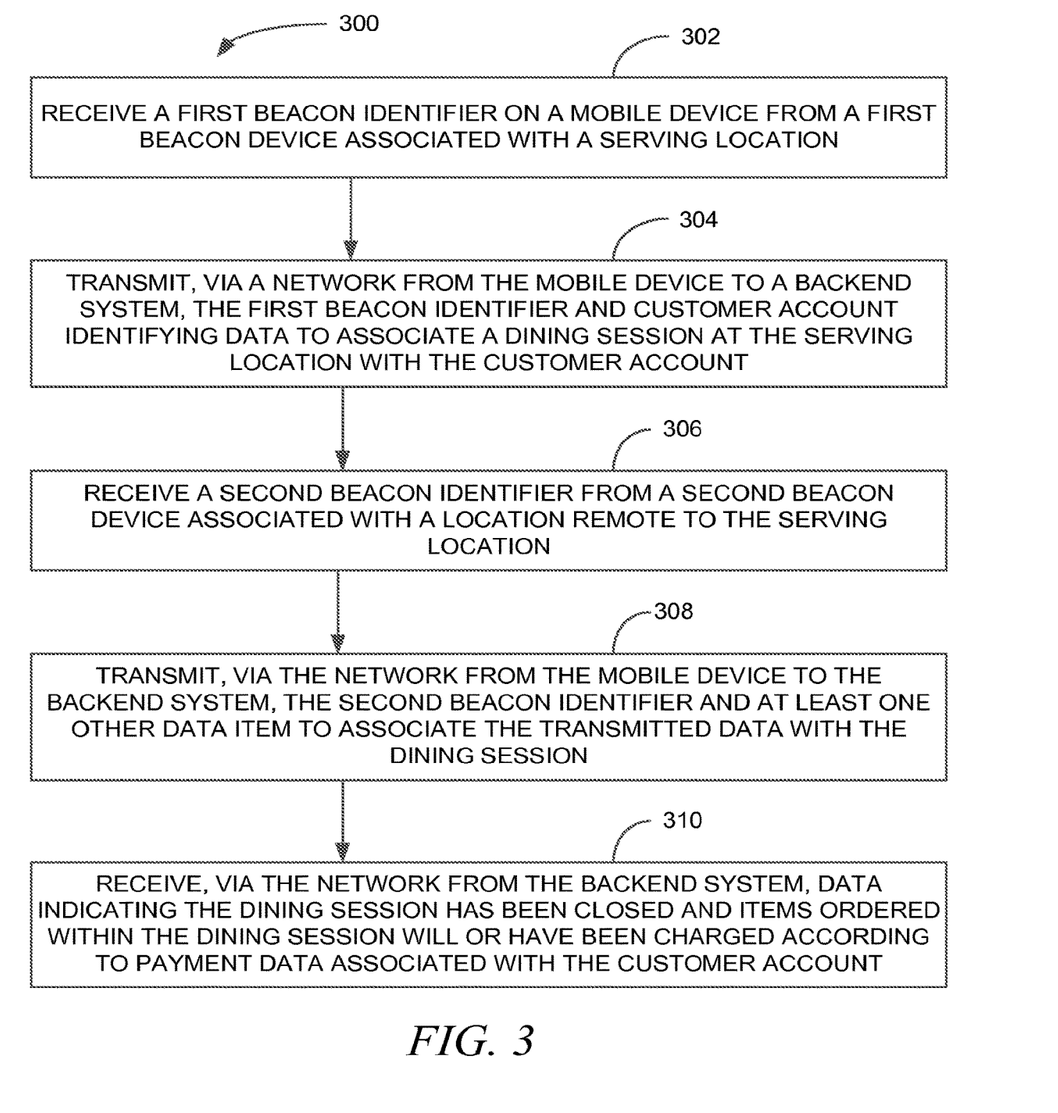
FIG. 3 is a block flow diagram of a method, according to an example embodiment.

FIG. 3 is a block flow diagram of a method 300, according to an example embodiment. The method 300 is an example of a method that may be performed on a mobile device, such as within a mobile device app.

The method 300 includes receiving 302 a first beacon identifier on a mobile device from a first beacon device associated with a serving location, such as a beacon device located at a dining table in a restaurant. The method 300 further includes transmitting 304, via a network from the mobile device to a backend system, the first beacon identifier and customer account identifying data to associate a dining session at the serving location with the customer account. The customer account identifying data may include all or a portion of a customer account login credential such as may be received within a user interface of a mobile device app performing the method.

The method 300 may then receive 306 a second beacon identifier from a second beacon device associated with a location remote to the serving location and transmit 308, via the network from the mobile device to the backend system, the second beacon identifier and at least one other data item to associate the transmitted data with the dining session. Next, the method 300 includes receiving 310, via the network from the backend system, data indicating the dining session has been closed and items ordered within the dining session will or have been charged according to payment data associated with the customer account.

In some embodiments, the method 300 also includes receiving, via the network, menu data of items available for order at the serving location and presenting, on a display of the mobile device, at least one view generated based on the received menu data. The mobile device may then receive, such as within a mobile device app, selection input with regard to at least one item presented in the at least one view of the received menu data. Data may then be transmitted to the backend system representative of the selection item input and at least one other data item to associate the transmitted data with the dining session.

In a further embodiment, the method 300 includes receiving, via the network from the backend system, data indicating the customer account does not include associated payment data and then presenting, on the display of the mobile device, a user interface to receive payment data to associate with the customer account. Once the payment data has been received, the payment data may be transmitted via the network from the mobile device to the backend system, 14.

Figure 4:
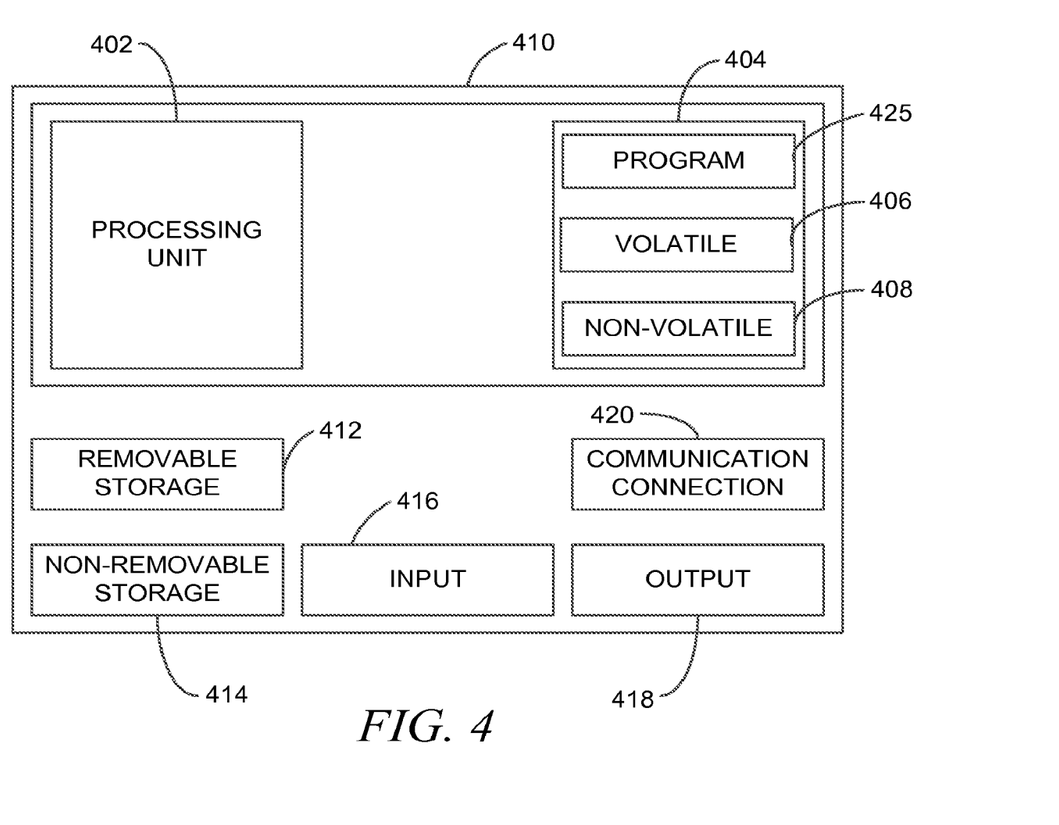
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
    at least one network interface device;
    at least one processor;
    at least one memory; and
    an instruction set, stored in memory and executable by the at least one processor to automatically perform data processing activities, the data processing activities comprising:
        receiving, via the at least one network interface device, a customer account identifier and a beacon identifier associated with a serving location within a dining session location;
        querying a database to retrieve a dining session identifier of a dining session associated with the serving location;
        storing, in the database, data associating the dinning session identifier with the customer account identifier;
        receiving, via the at least one network interface device, and storing, within the database, data of items ordered with the dining session identifier;
        receiving, via the at least one network interface device from a mobile device associated with the customer account, first data indicating the mobile device has potentially departed the dining session location;
        transmitting a request to the mobile device associated with the customer account requesting confirmation data indicating the customer has departed the dining session location;
        upon not receiving confirmation data that the mobile device associated with the customer account has departed the dining session location within an elapsed period, generating, from stored dining session data, a final bill including an amount payable;
        transmitting a notification to the mobile device associated with the customer account regarding the lack of receiving confirmation data indicating the mobile device has departed and is therefore processed as having departed the dining session location; and
        charging an amount payable from the final bill to a payment account associated with the customer account, the charging including transmitting, via the at least one network interface device to a transaction processing system, payment account data and an amount to be charged.

2. The system of claim 1, the data processing activities further comprising:
    transmitting data to at least one computing device of the dining session location indicating payment has been received for the dining session.

3. A method comprising:
    receiving, via a network interface device, a customer account identifier and a beacon identifier associated with a serving location within a dining session location;
    querying a database to retrieve a dining session identifier of a dining session associated with the serving location;
    storing, in the database, data associating the dinning session identifier with the customer account identifier;
    receiving, via the network interface device, and storing, within the database, data of items ordered with the dining session identifier;
    receiving, via the network interface device from a mobile device associated with the customer account, first data indicating the mobile device has potentially departed the dining session location;
    automatically transmitting a request to the mobile device associated with the customer account requesting confirmation data indicating the customer has departed the dining session location;
    upon not receiving confirmation data that the mobile device associated with the customer account has departed the dining session location within an elapsed period, automatically generating, from stored dining session data, a final bill including an amount payable;

automatically transmitting a notification to the mobile device associated with the customer account regarding the lack of receiving confirmation data indicating the mobile device has departed and is therefore processed as having departed the dining session location; and automatically charging an amount payable from the final bill to a payment account associated with the customer account, the charging including transmitting, via the at least one network interface device to a transaction processing system, payment account data and an amount to be charged.

\* \* \* \* \*